Dec. 21, 1965 A. HANSSON 3,224,239
PNEUMATIC RESHAPING OF CANS
Filed Aug. 17, 1962
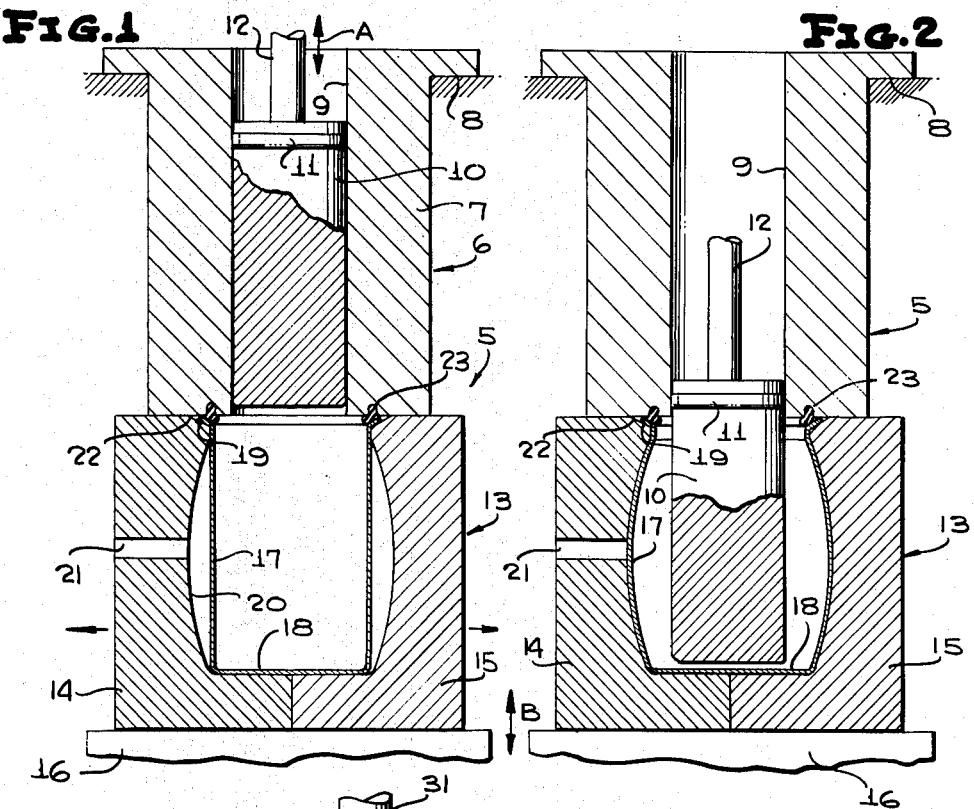
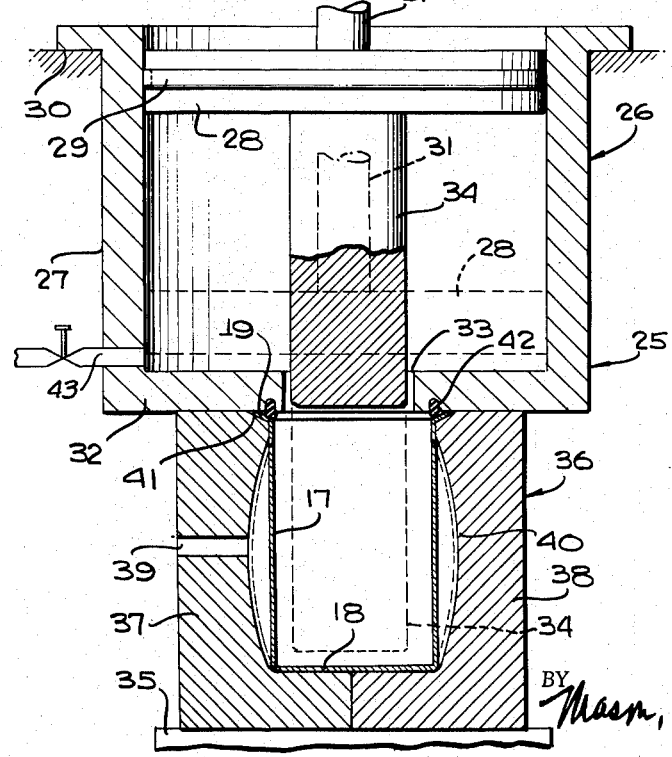
INVENTOR
ANTS HANSSON
ATTORNEYS

# United States Patent Office 3,224,239
Patented Dec. 21, 1965

3,224,239
PNEUMATIC RESHAPING OF CANS
Ants Hansson, Evanston, Ill., assignor to Continental Can Company, Inc., New York, N.Y., a corporation of New York
Filed Aug. 17, 1962, Ser. No. 217,556
7 Claims. (Cl. 72—62)

This invention relates in general to new and useful improvements in the reshaping of hollow metal and plastic articles, including containers of all types, and primarily cans, and more particularly relates to the reshaping of hollow articles by generating a sufficiently high air pressure within the article to cause a plastic flow of the walls of the article.

The invention in general relates to the placing of an article within a mold of a predetermined shape, and then pumping air directly into the mold against the article to effect the reshaping of the article to the shape of the mold. With the exception of the use of air, the shaping of articles in the manner described above has been practiced before this invention. It is well known to shape articles by pressurizing liquids within articles so that the liquid pressure will effect the stretching of the article to correspond to the mold in which the article is disposed.

Another method of shaping articles within a mold utilizes an explosive gas mixture which is ignited within the mold by an electric spark. The resulting pressure forces the article into the shape of the mold. The use of air in what may be considered pneumatic shaping of articles as compared to hydraulic shaping of articles or explosion shaping of articles has definite advantages.

Considering the pneumatic shaping of articles as compared to the hydraulic shaping of articles, it is pointed out that air naturally exists within the mold and within the article when the article is generally of a container configuration so that there is no need for filling the article and mold prior to the shaping operation or the emptying of the article and mold subsequent to the shaping operation, as is necessary in conjunction with hydraulic shaping. Further, except for the customary problem of retaining the air in a clean sterilized state as exists in the normal manufacture of containers, there is no problem as to the cleanliness of air as opposed to the use and reuse of a hydraulic liquid. Also, the energy required to obtain the pneumatic shaping of an article as compared to obtaining the hydraulic shaping of the same article is much less.

Comparing the pneumatic shaping of an article with the explosive shaping of an article, it is pointed out that the pneumatic shaping process is clean. There are no harmful corrosives or malodorous residues left on the article, as could be the case in reshaping with chemical explosives. Considerable less heat is developed with pneumatic shaping as compared to explosive shaping and, as a result, there is no damage to the coating on the article. The pressure is reproducible with respect to pneumatic shaping whereas it is erratic with explosive shaping. Also, pneumatic shaping requires in the order of five to ten times less energy than explosive shaping. Further, it is more reliable since occasionally an electric spark will not fire a combustible mixture of gases required in the explosive shaping operation.

In view of the foregoing, it is the primary object of this invention to provide a practical apparatus for and method of pneumatic reshaping articles formed of metal and plastic materials within a mold.

Another object of this invention is to provide a novel method of pneumatic shaping articles within molds wherein the heat generated in the compressing of the air is advantageously utilized in the heating of the air to provide for a much greater compressing of the air than that resulting from mechanical compressing alone.

A further object of this invention is to provide a novel method of shaping and reshaping articles within molds wherein the entire shaping operation is brought about through the compressing of air which is naturally disposed within the mold and thereby eliminate any necessity for foreign gases and liquids which must be considered for their after effects as well as the problems of handling the same.

Still another object of this invention is to provide a novel method of shaping and reshaping articles within molds wherein the pressure generated during the shaping operation can be readily reproduced in that a cylinder is utilized for the purpose of compressing the air and the pressure generated by the cylinder construction is determined by the length of the piston stroke.

With the above, and other objects in view that will hereinafter appear, the nature of the invention will be more clearly understood by reference to the following detailed description, the appended claims and the several views illustrated in the accompanying drawings.

In the drawings:

FIGURE 1 is a vertical sectional view showing schematically the apparatus utilized in carrying out a can reshaping operation in accordance with this invention, the apparatus being shown prior to the compressing of air, within the can.

FIGURE 2 is a vertical sectional view similar to FIGURE 1 and shows the piston in a lowered position wherein the air within the can has been compressed and the can reshaped to conform to the configuration of the mold.

FIGURE 3 is a vertical sectional view showing schematically another form of apparatus for accomplishing the reshaping of a can within a mold, a lowered position of the apparatus and the shaped position of the can being shown in dotted lines.

Referring now to the drawings in detail, it will be seen that there is illustrated in FIGURE 1 a simple apparatus for the pneumatic reshaping of cans in accordance with this invention. The apparatus is generally referred to by the numeral 5 and includes a cylinder unit, generally referred to by the numeral 6. The cylinder unit 6 includes a cylinder 7 which is suitably fixed against movement, as at 8. The cylinder 7 has a bore 9 in which there is mounted for reciprocation a piston 10. The piston 10 is provided at least adjacent the upper portion thereof with suitable sealing means, the sealing means having been illustrated as being in the form of a sealing ring 11 seated in a groove formed in the external surface of the piston 10. The piston 10 is carried by a piston rod 12 which is mounted for reciprocating movement in the direction of the arrows A. The piston rod 12 will be connected to a suitable crank mechanism (not shown) in the customary manner.

The apparatus 5 also includes a mold, generally referred to by the numeral 13 which is associated with the cylinder construction 6. The mold 13 is of the split mold type and includes a pair of halves 14 and 15 which are suitably mounted for opening and closing movement in a conventional manner. The mold halves 14 and 15 are carried by a support 16 for vertical movement toward and away from the cylinder construction 6 in the direction of the arrows B. It is to be understood that means will be provided for opening and closing the mold halves 14 and 15 automatically or manually, as desired, in sequence with the operation of the cylinder construction 6. The mold 13 is particularly adapted for the reception of a cylindrical can body 17 having one end closed by a can end 18. In the illustrated form of the can body 17, the can end 18 is integrally formed therewith. However, if desired, in accordance with this invention the can end 18 will be separately formed with respect to the can body 17 and secured thereto in a conventional double seaming operation. The can body 17 is provided at the upper end thereof with the customary flange 19.

The mold 13 is provided with a cavity 20 of a configuration to define a barrel-shaped container. The cavity 20 is vented to the atmosphere by means of one or more vents 21.

The upper end of the mold 13 is provided with a sloping cylinder 22 against which a flange 19 of the can body comes to bear so as to position the can within the mold 13. The underside of the cylinder 7 is provided with a sealing ring 23 which is pressure-engaged by the flange 19 of the can to provide for a seal between the cylinder 7, the can body 17 and the mold 13.

Operation

In the operation of the apparatus 5, the support 16 is initially in a lowered position and the mold 13 is open. The mold 13 is closed and the can is positioned therein, as is shown in FIGURE 1. The support 16 is then elevated toward the cylinder 7 with the flange 19 being brought to bear against the sealing ring 23 to provide for the necessary seal between the can body and the cylinder and the mold.

The piston 10 is now moved downwardly from its elevated position of FIGURE 1 to its lowermost position of FIGURE 2 with the result that the air disposed within the lower portion of the cylinder 7 is pumped into the interior of the can and as the piston 10 enters into the can, it displaces the air in the can so as to further compress the air. The resultant air pressure within the can will be sufficient to cause a plastic flow of the can body 17 to conform with the cavity 20 and the mold 13. This is clearly shown in FIGURE 2. As the can body 17 is outwardly expanded, the air trapped within the cavity 20 will escape through the vent openings 21.

The apparatus 5 illustrated in FIGURES 1 and 2 has a drawback in that very large lengths of piston strokes are required to generate the sufficiently high pressures for reshaping of cans. If it is desired to reduce the length of piston stroke, an apparatus such as that illustrated in FIGURE 3 may be utilized. The apparatus in FIGURE 3 is generally referred to by the numeral 25 and includes a cylinder construction generally referred to by the numeral 26. The cylinder construction includes a very large diameter cylinder 27 in which a relatively flat piston 28 is disposed. The piston 28 is provided with a piston ring or sealing ring 29 forming a seal with the wall of the cylinder 27. The cylinder 27 is fixedly supported against movement, as at 30. The piston 28 is provided with a piston rod 31 which, in turn, is connected to a conventional crank assembly (not shown) in order to effect the necessary reciprocation of the piston 28.

The cylinder 27 has a bottom wall 32 with a central opening 33 therethrough. A plunger 34 is secured to the underside of the piston 28 for movement through the opening 33.

The apparatus 25 also includes a vertically reciprocal support 35 on which a split mold, generally referred to by numeral 36, is mounted. The mold 36 is formed of two halves 37 and 38 which are mounted on the support 35 for opening and closing movement. At least the mold half 37 is provided with a vent opening 39 which extends into the cavity 40 of the mold 36 to vent the same.

The upper end of the mold 36 is provided with a shoulder surface 41 against which a flange 19 of a can disposed within the mold 36 may bear. The undersurface of the bottom wall 32 of the cylinder 27 is provided with a sealing ring 42 which cooperates with the shouldered surface 41 to effectively clamp the flange 19 therebetween and firmly seal between the can, the mold 36 and the cylinder 27.

It will be readily apparent that when the piston 28 moves downwardly within the cylinder 27, a large volume of air will be compressed and forced down into the can within the mold 36. Further, since the plunger 34 enters into the can, the amount of space within the can which may be occupied by the compressed air is reduced. The high pressure of the compressed air will effect the outward plastic flow of the can body 17 to conform to the generally barrel-shaped configuration of the mold 36.

At this time it is pointed out that the sealing rings 11 and 29 of the pistons can be of the general type utilized in automobile engines and commercial air compressors. However, under moderate operating conditions, Teflon sealing rings can be used on the pistons and thus eliminate the need for lubrication.

Utilizing the apparatus of FIGURES 1 and 3, pneumatic reshaping of cans can be performed very rapidly since the piston could be in constant reciprocal motion and the speed of the process is limited only by the speed of mold transfer, that is the time required to lower the mold, open the mold, removed a reshaped can from the mold, close the mold, position another can in the mold, and elevate the mold into sealing engagement with the cylinder.

It is pointed out that the piston of each of the two apparatuses illustrated and described could be actuated by a crankshaft equipped with a flywheel and operated by an electric motor. However, any type of crankshaft will suffice and it may be desired to utilize a constant driven shaft to which a crankshaft is coupled by means of a one revolution clutch which is controllable by the position of the mold in place relative to the cylinder.

Although in the apparatuses shown in FIGURES 1 and 3 the initial pressure is one atmosphere, it is possible to increase the initial pressure by introducing compressed air via a valved orifice such as 43 into the lower end of the cylinder at the beginning of the stroke. This will produce a higher final pressure at the same compression ratio of the cylinder construction.

Considering the pneumatic reshaping of a can from a thermodynamical point of view, if the pneumatic reshaping is carried out fast, the process can be considered as an adiabatic compression, and the following modification of Boyle's law will apply:

$$\frac{P_2}{P_1} = \left(\frac{V_1}{V_2}\right)^\gamma$$

$P_1$ = initial pressure in can
$P_2$ = final pressure
$V_1$ = initial volume of the can
$V_2$ = final volume
$\gamma$ = specific heat ratio Using this formula, it can be calculated that a compression ratio $$\frac{V_1}{V_2}$$

of 22.4 will be necessary to reshape a 2 11/16 inch diameter tinplate beer can having a wall thickness of approximately 0.010 inch. It is assumed in this calculation that a final pressure, $P_2$, of 80 atmospheres will be required and that the final volume, $V_2$, consisting of the clearance between the plunger and the can body plus a 20% increase in can volume, will be 10 cubic inches.

A feature of this invention is based upon the fact that while the volume of air, in the above example, is decreased 22.4 times, the pressure increases 80 times, that is to 80 atmospheres. This additional pressure is caused by the adiabatic heating of the air during compression. Heat evolved in compression therefore is usefully employed in pneumatic reshaping. This is an advantage of the pneumatic process as compared to reshaping with precompressed air, which essentially is an isothermal process. In an isothermal process, all heat would be dissipated to the surroundings without performing any useful work, and a total compression ratio of 80 to 1 would be required rather than the ratio of 22.4 to 1 in an adiabatic process.

It is pointed out at this time that the 22.4 to 1 compression ratio required in the theoretical adiabatic compression process is not sufficient in practice in that the process will not be completely adiabatic. However, the adiabatic process has a great advantage over the isothermic process.

The final temperature in pneumatic reshaping is calculated as follows:

$$T_2 = \frac{P_2 V_2}{nR}$$

$T_2$ = final temperature
$n$ = number of moles of air in the can
$R$ = gas constant It can be calculated that for a final pressure of 80 atmospheres and a final volume of 10 cubic inches, the maximum temperature in pneumatic reshaping is 1390° F. Again, in practical applications the process will not be quite adiabatic since some of the heat will be absorbed by the can and the plunger so that the real temperature will be somewhat lower than 1390° F. Although this temperature still may appear to be very high, the amount of heat involved is small and no damage will be inflicted to the metal or coatings on the can.

The energy required to compress the air in a $2^{11}/_{16}$ inch diameter beer can to 80 atmospheres can be calculated as follows:

$$-W = \frac{\gamma(P_2 V_2 - P_1 V_1)}{\gamma - 1}$$

$$-W = 29{,}800 \text{ in. lbs.} = 2{,}480 \text{ ft. lbs.}$$

In contrast to the above figure, the energy released in the compression of methane contained in a similar can at a partial pressure of 1 atmosphere would be 14.6 B.t.u., or 11,350 ft. lbs. Accordingly, approximately 4.5 times as much energy is required in explosive reshaping as in pneumatic reshaping. It is also pointed out that whereas in pneumatic reshaping compressed air possesses a considerable amount of potential energy at the end of the stroke which can be recovered in the backstroke of the piston, in explosive reshaping the entire heat content of the gas is lost after the explosion. This adds even more to the economy of pneumatic reshaping and makes pneumatic reshaping approximately nine times as efficient as explosive reshaping.

Comparing the advantages of adiabatic pneumatic reshaping of cans as compared to hydraulic reshaping of cans, it is pointed out that when water or oil is utilized in the reshaping of a can under pressure, the heat involved is extremely minor and there is no adiabatic advantage. Further, because water and oil for all practical purposes are incompressible, there is no return pressure on the piston once the piston has made a slight return travel. Thus, hydraulic shaping as opposed to pneumatic shaping does not have the advantages of the adiabatic process or the return pressure on the piston, and at the same time it has the disadvantage of having to fill the units with the particular liquid being utilized and the emptying of such liquid, as well as the necessary control of the cleanliness of such liquid.

Although the invention has been specifically illustrated and described with respect to the reshaping of cans, it is to be understood that the invention may be utilized in the reshaping of all types of container articles, and may equally as well be utilized in the reshaping of articles within molds from flat sheets.

It will be readily apparent that there has been devised a highly desirable method of shaping and reshaping articles utilizing air and which method is both clean and inexpensive. Although only two applications of the invention have been illustrated and described herein, it is to be understood that other variations may be made in the invention within the spirit and scope of the invention, as defined in the appended claims.

I claim:
1. A method of reshaping a hollow member utilizing a vented mold and a cooperating pneumatic pump of the positive displacement type, said method comprising the steps of seating said hollow member in said mold with only a single end of said member unsealed, sealing the periphery of said single end relative to said mold and pump, and actuating said pump to positively compress, substantially adiabatically, the air present within said pump and member between said pump and member whereby the heat resulting from the work of the positive compression of said air by said pump acts simultaneously with said positive compression to increase the pressure of said air sufficiently to reshape said member in accordance with the internal contour of said mold.

2. The method of reshaping a hollow member defined in claim 1 including the additional step of introducing additional compressed air within said pump and member prior to said actuating of said pump.

3. A method of reshaping a hollow member utilizing a vented mold and a cooperating pneumatic pump of the positive displacement type, said method comprising the steps of seating said hollow member in said mold with only a single end of said member unsealed, sealing the periphery of said end relative to said mold and pump, and actuating said pump to positively compress the air present within said pump and member between said pump and member with a rapidity sufficient that the heat resulting from the work of the positive compression of said air by said pump will act simultaneously with said positive compression to increase the pressure of said air sufficiently to reshape said member in accordance with the internal contour of said mold.

4. The method of reshaping a hollow member defined in claim 3, including the additional step of introducing additional compressed air within said pump and member prior to said actuating of said pump.

5. A method of reshaping a hollow member utilizing a vented mold and a cooperating pneumatic pump of the positive displacement reciprocating piston type, said method comprising the steps of seating said hollow member in said mold with only a single end of said member unsealed, sealing the periphery of said single end relative to said mold and pump, and actuating said pump to motivate said piston to enter into said member to reduce the internal volume of said member and to positively compress the air within said pump and member between said piston and member with a rapidity sufficient that the heat resulting from the work of the positive compression of said air by said piston will act simultaneously with said positive compression to increase the pressure of said air sufficiently to reshape said member in accordance with the internal contour of said mold.

6. A method of reshaping a hollow member having only a single open end utilizing a vented mold and a cooperating pneumatic pump of the positive displacement type, said method comprising the steps of seating said hollow member in said mold, sealing the periphery of said open end relative to said mold and pump, and actuating said pump to positively compress the air present within said pump and member between said pump and member with a rapidity sufficient that the heat resulting from the work of the positive compression of said air by said pump will act simultaneously with said positive compression to increase the pressure of said air sufficiently to reshape said member in accordance with the internal configuration of said mold.

7. A method of reshaping a hollow member utilizing a vented mold formed of two halves and a pneumatic pump of the positive displacement type, said method comprising the steps of joining together said two mold halves, seating said hollow member in said mold with only a single end of said member unsealed, sealing the periphery of said single end relative to said mold and pump, actuating said pump to positively compress the air present within said pump and member between said pump and member with a rapidity sufficient that the heat resulting from the positive compression of said air by said pump will act simultaneously with said positive compression to increase the pressure of said air sufficiently to reshape said member in accordance with the internal contour of said mold, deactuating said pump to allow said air to expand promoting said deactuating, separating said mold and pump, divorcing said mold halves and removing the reshaped member.

References Cited by the Examiner

UNITED STATES PATENTS 1,711,445 4/1929 Burvenick _____ 113—44
3,043,254 7/1962 Heidmann _____ 113—44

FOREIGN PATENTS 428,856 5/1926 Germany.

WILLIAM J. STEPHENSON, *Primary Examiner.*

WHITMORE A. WILTZ, *Examiner.*